March 12, 1968  W. W. THOM  3,372,521
FLOOR JOINT COVER ASSEMBLY
Filed June 2, 1965  2 Sheets-Sheet 1
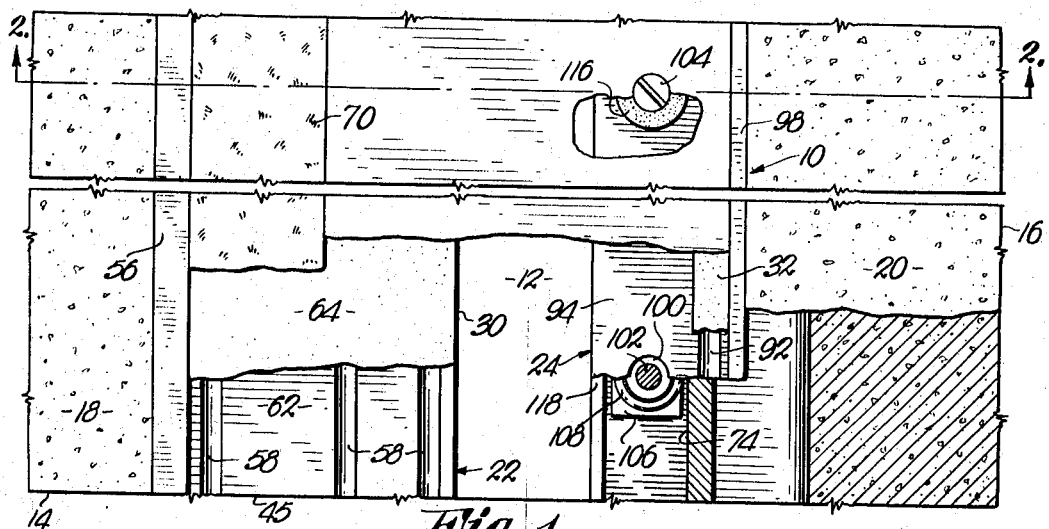
INVENTOR.
Wenzel W. Thom
BY
Hovey, Schmidt, Johnson & Hovey
ATTORNEYS.

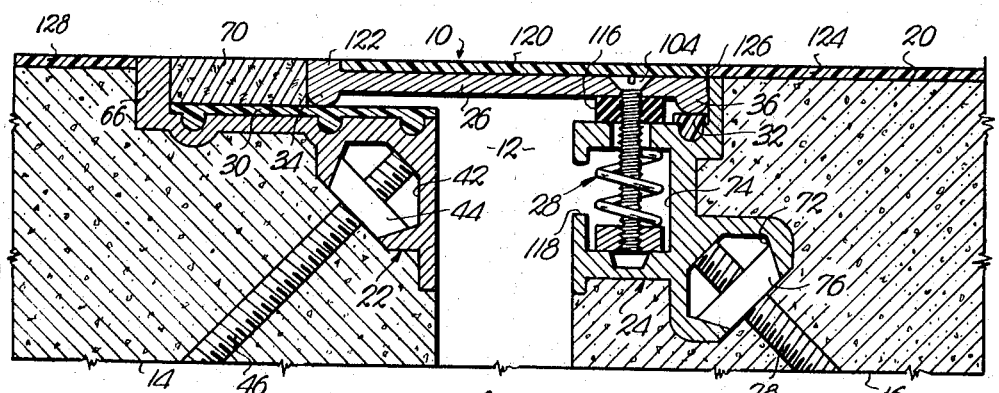
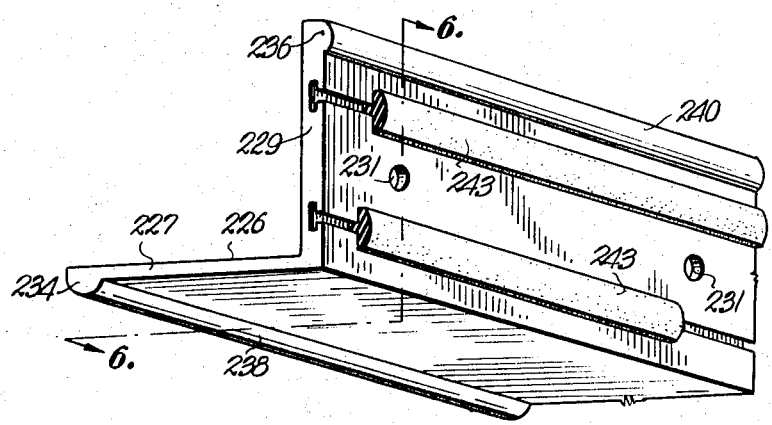
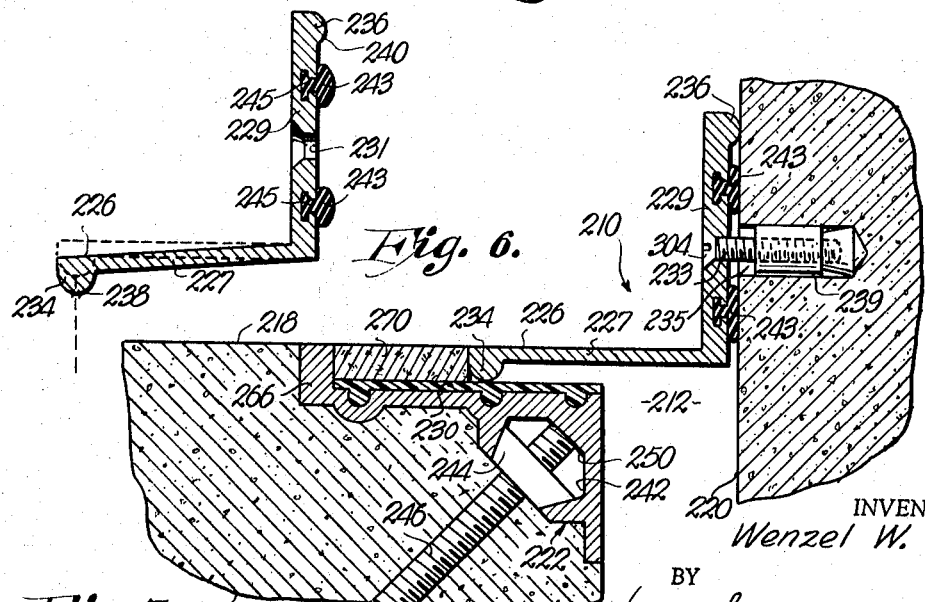

United States Patent Office 3,372,521
Patented Mar. 12, 1968

3,372,521
FLOOR JOINT COVER ASSEMBLY
Wenzel W. Thom, Wichita, Kans., assignor of one-half to Cecil D. Jones, Wichita, Kans.
Filed June 2, 1965, Ser. No. 460,654
12 Claims. (Cl. 52—395)

ABSTRACT OF THE DISCLOSURE

A floor joint cover assembly having a cover plate resiliently mounted on one anchor member with a bolt and spring so as to bias the cover plate against the other anchor member closing the joint and allowing the cover plate to pivot or move vertically on the anchor member. The cover plate presses against a resilient material providing a flat surface regardless of the relative positions on the structural sections.

---

This invention relates to improvements in covers for open floor joints of the type formed by a pair of spaced, closely adjacent, relatively shiftable structural sections and has as its primary object the provision of an improved floor joint cover assembly which not only continues to cover and thereby seal a floor joint during expansion and contraction of the structural sections defining the joint, but also gives an attractive and finished appearance to the joint when the assembly is installed in place.

Another object of this invention is the provision of a floor joint cover assembly of the type described wherein a cover plate forming a part of the assembly is biased in a direction to close the joint, whereby the joint will be sealed against the entrance of moisture thereinto for all relative positions of the structural sections defining the joint.

Yet another object of the present invention is the provision of a floor joint cover assembly of the aforesaid character wherein the cover plate is provided with resilient structure adjacent one extremity thereof for effecting the entire biasing of the cover plate, whereby the opposite extremity of the cover plate is free to shift relative to the structural section engaged thereby during relative movements of the structural sections which define the joint covered by the cover plate. Hence, the stresses on the cover plate are kept at a minimum to thereby minimize damage to the cover plate assembly itself.

A further object of this invention is the provision of a cover plate assembly which not only is capable of covering an open floor joint, but also, is capable of closing a ceiling joint and an open joint between a horizontal floor section and a vertical wall section.

Still a further object of the present invention is the provision of an assembly of the type described which, for the most part, may be constructed using well known forming techniques so that the assembly can be constructed in a minimum of time at minimum cost without detracting from its ability to seal an open floor joint and without impairing its attractive appearance when installed for use.

In the drawings:

FIGURE 1 is a top plan view of one form of the cover assembly for closing the open floor joint between a pair of structural sections having horizontally disposed upper surfaces, parts being broken away to illustrate details of construction;

FIG. 2 is a cross-sectional view taken along line 2—2 of FIG. 1;

FIG. 3 is a cross-sectional view taken along line 3—3 of FIG. 2;

FIG. 4 is a view similar to FIG. 2 but illustrating a slightly modified form of the cover assembly;

FIG. 5 is a perspective view of the cover plate of another form of the invention;

FIG. 6 is a cross-sectional view taken along line 6—6 of FIG. 5; and

FIG. 7 is a cross-sectional view showing the way in which the cover plate of FIG. 5 is mounted in covering relationship to an open joint defined by the horizontal and vertical surfaces of a pair of adjacent structural sections.

The present invention provides an improved cover assembly for the open joint between a pair of spaced, closely adjacent structural sections which expand and contract due to temperature changes and the like. As the sections expand and contract with respect to each other the size of the joint therebetween varies and, by virtue of the assembly of this invention, the joint continues to be closed and thereby sealed against the entrance of moisture thereinto, while at the same time, the assembly provides a neat and attractive appearance for the junction between the structural sections by concealing the rough, unfinished surfaces and edges of the structural sections themselves. The assembly includes a cover plate and resilient structure for biasing the cover plate into closing relationship at all times regardless of the relative positions of the structural sections. Hence, the cover plate itself compensates for changes in the relative positions of the structural sections while effectively bridging the gap therebetween presented by the open joint.

In one form of the invention, the cover plate is connected to an anchor member which, in turn, has means thereon for securing the same to one of the structural sections. The resilient structure comprises a coil spring which biases the plate mounting means in a direction to force the plate into tight, frictional engagement with another anchor member which, in turn, has means for securing it to the opposite structural section defining the joint covered by the cover plate. Sealing strips on the anchor members engage the cover plate to effectively prevent the entrance of moisture or the like into the joint beneath the cover plate. The outer surface of the cover plate may be flush with the upper surfaces of the structural sections or may be recessed to receive a layer of vinyl tile which covers the upper surfaces of the structural sections.

Another form of the invention includes a transversely L-shaped cover plate having an inherent resilience for biasing one side thereof into tight frictional engagement with an anchor member secured to one structural section defining a joint. The other side of the cover plate is secured to the outer surface of the other structural section defining the joint, with the outer surfaces of the sections being substantially perpendicular to each other. Thus, the concepts of this invention may be utilized, not only with joints defined by side-by-side floor sections, but also with a joint between a floor section and a wall section or the joint between a sealing section and a wall section.

One form of the cover assembly of this invention, denoted by the numeral 10, may be used in a number of different ways. However, for purpose of illustration, assembly 10 is adapted for use in covering the joint 12 between a pair of spaced, closely adjacent structural sections 14 and 16 having upper, substantially flat, generally horizontally disposed surfaces 18 and 20 respectively. As shown in FIGS. 1–3, sections 14 and 16 are formed from a cementitious material and such sections shift relative to each other when they expand and contract. For instance, the sections may move toward and away from each other, as well as move upwardly and downwardly. Hence, the size of joint 12 will vary and assembly 10 is constructed to cover and thereby seal joint 12 regardless of its size.

Assembly 10 includes a first anchor member 22 secured to section 14 and a second anchor member 24 secured to section 16. A cover plate 26 spans the distance between anchor members 22 and 24 and is provided with structure 28 for mounting it on anchor member 24 as shown in FIG. 2. Structure 28 is resilient and arranged in a manner hereinafter described so that cover plate 26 is biased downwardly into tight, sealing engagement with sealing strips 30 and 32 carried by anchor members 22 and 24 respectively. Cover plate 26 has a pair of ribs 34 and 36 provided with convex outer faces 38 and 40 for engaging strips 30 and 32 respectively. Thus, ribs 34 and 36 will engage strips 30 and 32 respectively for all operative positions of cover plate 26.

Anchor members 22 and 24, cover plate 26, and strips 30 and 32 extend longitudinally of joint 12. To this end, these components are made in suitable lengths depending upon the length of joint 12.

Anchor member 22 is provided with a longitudinally extending channel 42 for receiving threaded nuts 44 which, in turn, are threadably coupled with screws 46 having heads 48 thereon. Channel 42 is disposed between a vertical side 43, and a horizontal side 45, sides 43 and 45 defining the major portion of anchor member 22. The inner ends of screws 46 are forced against the innermost surface 50 of channel 42 so that screws 46 are in fixed positions along the length of anchor member 22. When structural section 14 is being formed, anchor member 22 is placed in position with screws 46 embedded within the cementitious material forming section 14, the outer surface 52 of side 43 substantially flush with a face 54 of section 14 adjacent to joint 12, and an upper surface 56 flush with upper surface 18.

Side 45 of anchor member 22 is provided with a number of arcuate recesses 58 for receiving respective, aligned ribs 60 on strip 30. Ribs 60 are caused to enter recesses 58 by moving strip 30 endwise onto the upper face 62 of side 45. The upper surface 64 of strip 30 is engaged by rib 34 of cover plate 26.

The longitudinally extending projection 66 extending upwardly from side 45 and defining surface 56, defines one boundary of a recess 68 between cover plate 26 and projection 66. A strip 70 of yieldable material, such as cork or the like, fills recess 68 and expands and contracts in response to movements of cover plate 26 in opposed directions as structural sections 14 and 16 move toward and away from each other.

Anchor member 24 is provided with a pair of channels 72 and 74, channel 72 being utilized for the same purpose as channel 42 of anchor member 22. To this end, a number of internally threaded nuts 76 are provided along the length of channel 72 and threadably receive respective screws 78 which, in turn, bear against the inner surface 80 of channel 72 so that screws 78 are in fixed positions along the length of anchor member 24. The heads 82 of screws 78 retain anchor member 24 in place in sections 16 when heads 82 are embedded in the cementitious material forming sections 16. As shown in FIG. 2, anchor member 24 has an outer side surface 84 substantially flush with the corresponding side surface 86 of section 16. In addition, anchor member 24 is provided with a generally horizontal surface 88 in substantial alignment with upper face 62 of anchor member 22.

Strip 32 has a longitudinally extending rib 90 which is complementally received within a recess 92 in the upper portion 94 of anchor member 24. Rib 36 engages the upper surface of strip 32 when cover plate is in the position shown in FIG. 2. A projection 96 extends upwardly from portion 94 and has an upper face 98 flush with upper surface 20 of section 16. The upper surfaces of cover plate 26 and strip 70 are normally substantially flush with upper surfaces 18 and 20 of sections 14 and 16, and surfaces 56 and 98 of projections 66 and 96.

Upper portion 94 of anchor member 24 is provided with a number of longitudinally spaced openings 100, only one of which is shown in FIG. 2. Each opening 100 is adapted to receive a respective post or screw 102 having a flat head 104 countersunk in cover plate 26. Each screw 102 is threadably coupled to a respective nut 106 within channel 74, and a coil spring 28 surrounding screw 102 spans the distance between nut 106 and the upper surface 110 of channel 74. Spring 108 is under compression so that nut 106, and thereby screw 102, is biased downwardly. A longitudinally extending depression 112 is formed in the lower portion 114 of anchor member 24 to receive projecting portions of screws 102 if the latter are slightly longer than desired. An annular washer 116 of soft rubber or the like surrounds each screw 102 and engages the later between cover plate 26 and upper portion 94 as shown in FIG. 2 to prevent the entrance of moisture into joint 12 at the junction of cover plate 26 and head 104.

By virtue of screws 102 and their associated springs 108, cover plate 26 is biased downwardly so that ribs 34 and 36 remain in tight frictional engagement with strips 30 and 32 for all operative positions of sections 14 and 16. As sections 14 and 16 move toward each other, strip 70 is further compressed, while rib 34 slides over upper surface 64 of strip 30. Conversely, strip 70 expands as sections 14 and 16 move apart. In either case, rib 34 remains in sealing engagement with strip 30. As section 14 rises with respect to section 16, cover plate 26 rocks slightly in a clockwise sense about the fulcrum defined by the interengagement of rib 36 and strip 32. Conversely, as section 14 moves downwardly with respect to section 16, cover plate 26 rocks in the opposite direction. In either case, rib 34 continues to remain in sealing engagement with strip 30 and it is, of course, clear that rib 36 will, at all times, be in sealing engagement with strip 32. Thus, for all movements of sections 14 and 16 relative to each other, cover plate 26 will continue to close and thereby seal joint 12 to prevent the entrance of moisture and the like thereinto. To facilitate the insertion of nuts 106 and springs 108 into channel 74, an opening 118 is provided in the side of anchor member 24 adjacent to joint 12. Also, nuts 106 and springs 108 may be placed in channel 74 from either end of the latter.

In use, anchor members 22 and 24 are embedded into the cementitious material forming sections 14 and 16 after the latter have been poured and before they have set to a hardened condition. With anchor members 22 and 24 securely coupled with sections 14 and 16 respectively, strips 30 and 32 may be mounted thereon if such has not been done prior to the placing of anchor members 22 and 24 in sections 14 and 16. Screws 102 are then threaded into nuts 106 until ribs 34 and 36 are in sealing engagement with strips 30 and 32. Strip 70 may then be inserted in place to render the installation complete.

Movements of sections 14 and 16 will result in corresponding movements of cover plate assembly 26 so that not only will joint 12 continue to be sealed by assembly 10, but also, assembly 10 will provide a neat and finished appearance for the junction between sections 14 and 16.

As shown in FIG. 4, cover plate 26 is slightly modified to permit the mounting of a strip 120 of vinyl tile or the like thereon. Cover plate 26, in the form shown in FIG. 4, has a longitudinally extending projection 122 which, with a vinyl tile strip 124 on upper surface 20 of section 16, forms a recess for receiving strip 120. It is noted that strips 120 and 124 are separated from each other at a line of juncture 126 so that movements of cover plate 26 will be substantially unimpeded by strip 124.

Also, projection 66 is slightly increased in height to provide a boundary for another vinyl strip 128. Strip 70 will, therefore, have a greater thickness than is shown in FIG. 2.

Cover plate 26 in either of the above-mentioned forms may be readily secured in place or removed if necessary. By virtue of the various springs 108 associated with screws 102, plate 26 is biased downwardly at all times and for all operative locations of sections 14 and 16 whereby joint 12 is sealed against the entrance of moisture or the like thereinto notwithstanding the fact that sections 14 and 16 may shift relative to each other in all directions. If desired, nuts 106 may be joined together as a unit to facilitate the mounting of cover plate 26 in place. To this end, a strip having threaded bores therethrough could be utilized for coupled relationship with the various screws 102.

Assembly 10 is neat and attractive and effectively conceals joint 12 while continuing to seal the same at all times. Since the various components of the form of assembly 10 shown in FIGS. 1–3 are substantially flush with surfaces 18 and 20 of sections 14 and 16, the floor surface is unimpeded for all operative positions of sections 14 and 16 with respect to each other. In the form shown in FIG. 4, only a small portion of assembly 10 is observable inasmuch as the vinyl tile strips 120, 124 and 128 almost conceal the presence of assembly 10 while permitting the use of floor covering material of any desired construction and design. For the most part, only strip 70 is visible, and since the upper surface of strip 70 is substantially flush with the upper surfaces of the vinyl tile strips, assembly 10 thus provides a neat and finished appearance for the floor when installed in place.

Another form of the assembly of this invention is illustrated in FIG. 7 and is denoted by the numeral 210. Assembly 210 is adapted to cover and thereby seal the joint 212 between a pair of spaced, closely adjacent, relatively shiftable structural sections 214 and 216, section 214 having a substantially horizontal upper surface 218, and section 216 having a substantially vertical surface 220. An anchor member 222 similar in all respects to anchor member 22, is secured to structural section 214 in the manner illustrated in FIG. 7 through the medium of a screw 246 coupled to a nut 244 and bearing against a surface 250 defining one boundary of a channel 242 in anchor member 220.

A strip 230 of sealing material is coupled with anchor member 222 in the same manner as strip 30 is coupled with anchor member 22. A strip 270 of the same material as strip 70 is provided on a portion of the upper surface of strip 230 and closes the gap between a projection 266 of anchor member 222 and a transversely L-shaped cover plate 226 secured to section 216 in a manner hereinafter described.

As shown in FIG. 5, cover plate 226 includes a first side 227 integral with a second side 229. Side 227 has a rib 234 provided with a convex, outer face 238 which slidably engages the upper surface of strip 230.

Side 229 is provided with a number of longitudinally spaced holes 231 therethrough for receiving screws 233, the latter in turn extending into bores 235 in section 216. Bores 235 are aligned with holes 231 when cover plate 226 is in the disposition shown in FIG. 7. A fastener 239 is provided within each bore 235 respectively and is threadably coupled to the corresponding screw 233 for mounting side 229 along surface 220. Side 229 is provided with a pair of longitudinally extending grooves 241 on opposed sides of holes 231 as shown in FIG. 5. A plurality of resilient ribs 243 are provided with T-shaped extensions 245 extending into respective grooves 241 in a manner such that ribs 243 project laterally from one face of side 229 as shown in FIG. 6.

Side 229 is provided with a longitudinally extending rib 236 having a convex, outer face 240 which engages surface 220 of section 216 when cover plate 226 is mounted in place. Each hole 231 is countersunk as shown in FIG. 6 to accommodate the flat head 304 of the corresponding screw 233.

As shown in FIG. 6, side 227 is initially in the full-line position with respect to side 229 prior to the installation of cover plate 226 so that, when cover plate 226 is mounted in its operative position as shown in FIG. 7, side 227 will be biased downwardly by the inherent resilience of cover plate 226. Thus, under normal operating conditions, side 227 is in the dashed-line position of FIG. 6 whereby there will, at all times, be a downward force exerted on side 227 to urge the latter against strip 230. This bias force is, in actuality, the restoring force due to the spring-like characteristics of cover plate 226.

In use, anchor member 222 is secured in the usual manner to section 214 and cover plate 226 is secured to section 216 by screws 233. Rib 236 engages surface 220 and provides a sealing action to prevent moisture or the like from entering joint 212 along surface 220. Ribs 243 are compressed when side 229 is in the position of FIG. 7 so that side 229 will be uniformly spaced from surface 220.

Rib 234 will engage strip 230 and is capable of sliding therealong toward and away from joint 212 as sections 214 and 216 move toward and away from each other and upwardly and downwardly relative to each other. Side 227 is normally flexed upwardly into the dashed-line position of FIG. 6 so that its inherent resilience will bias it downwardly and into sealing engagement with strip 230. Joint 212 is thus sealed against the entrance of moisture thereinto, notwithstanding the fact that sections 214 and 216 may move with respect to each other in all directions.

As sections 214 and 216 move toward each other, rib 234 slides along strip 230 and strip 270 is further compressed. Conversely, strip 270 expands and rib 234 moves in the opposite direction when sections 214 and 216 move apart.

As section 214 moves upwardly with respect to section 216, side 227 will rock in a counterclockwise sense while rib 234 continues to engage strip 230. Conversely, when section 214 moves downwardly with respect to section 216, side 227 will rock in a counterclockwise sense while remaining in sealing engagement with strip 230.

Assembly 210 gives a neat and finished appearance to the junction between sections 214 and 216 inasmuch as side 227, strip 270 and the upper surface of projection 266 are substantially flush with surface 218. Moreover, the heads 304 of screws 233 are countersunk to provide a substantially smooth outer surface for side 229.

Having thus described the invention, what is claimed as new and desired to be secured by Letters Patent is:

1. An assembly for closing the open joint defined by a pair of spaced, closely adjacent, relatively shiftable structural floor sections comprising:

an elongated anchor member for each floor section respectively, each member having means thereon for securing the same in a fixed position to its respective floor section, each of said anchor members having a longitudinally extending surface, said surfaces of said anchor member being disposed laterally of said joint and said anchor members being spaced apart when the latter are secured to respective floor sections;

an elongated cover plate spanning the distance between and overlying the major portion of said anchor members and having a pair of spaced extremities adjacent to and engageable with said surfaces of respective anchor members when the latter are in said fixed positions thereof, one of said anchor members having a longitudinally extending channel below said cover plate and a number of longitudinally spaced openings therethrough adjacent to said surface of said one anchor member, said openings communicating with said channel and being between said joint and said surface of said one anchor member when the latter is secured to the corresponding floor section;

a number of longitudinally spaced posts carried by said cover plate intermediate said extremities and extending downwardly therefrom through respective openings of said one anchor member and into said channel;

a projection for each post respectively, each projection being on the portion of the respective post within said channel; and spring means for each post respectively between the corresponding projection and said one anchor member for biasing the respective post into the channel to thereby urge said extremities of said cover plate into engagement with said surfaces of respective anchor members, whereby said cover plate will continue to engage said surfaces and thereby cover said joint as said floor sections move toward and away from each other and relative to each other transversely of said cover plate.

2. An assembly as set forth in claim 1, wherein each anchor member is provided with a strip of sealing material defining said surface thereof, said cover plate having a rib defining each extremity thereof respectively, each rib having a convex, strip-engaging face.

3. An assembly as set forth in claim 1, wherein said post includes a screw releasably secured to said cover plate, said projection including a nut threadably coupled to said screw, said spring means including a coil spring surrounding said screw, and means sealing the junction between said screw and said cover plate.

4. An assembly as set forth in claim 1, wherein said floor sections are provided with substantially horizontal upper surfaces, the entire upper surface of said cover plate being substantially horizontally aligned with said upper surfaces of said floor sections.

5. An assembly as set forth in claim 1, wherein said floor sections are provided with substantially horizontal upper surfaces each having a covering strip thereon, the major portion of the upper surface of said cover plate being substantially horizontally aligned with said upper surfaces of said floor sections, and including a covering strip on said major portion of the upper surface of said cover plate, a minor portion of the upper surface of said cover plate and the upper face of said covering strip on said cover plate being substantially horizontally aligned with the upper faces of the covering strips on said floor sections when said cover plate covers said joint.

6. An assembly for closing the open joint defined by a pair of spaced, closely adjacent, relatively shiftable structural sections comprising:
a pair of anchor members having means thereon for securing the same to respective structural sections of said pair adjacent to the joint defined thereby, one of the anchor members being provided with a surface disposed laterally of said joint when said one anchor member is secured to a structural section; and
a cover unit including a cover plate and coupling means for connecting said cover plate to the other anchor member of said pair with said cover plate being adjacent to said surface of said one anchor member and in covering relationship to said joint, said other anchor member having a projection presenting a surface in underlying spaced, generally parallel relationship to the cover plate, said cover unit having post means mounted thereon and projecting downwardly therefrom, said projection on the other anchor member being provided with opening means therein clearing respective post means and permitting movement of the latter from side to side as well as back and forth through the opening, and resilient structure connected to and movable with the post means independently of said other anchor member below the projection thereof, said resilient structure engaging the projection and biasing said cover plate toward and into engagement with the anchor members, whereby said cover plate is free to move in and out and pivot while continuing to engage said surface of the one anchor member and thereby cover said joint as said structural sections move toward and away from each other and relative to each other transversely of said cover plate.

7. An assembly as set forth in claim 6, wherein said cover plate has an extremity provided with a convex face normally engaging the upper surface of said other anchor member.

8. An assembly as set forth in claim 6, wherein is provided a strip of sealing material on the face of said other anchor member defining said surface, the face of the cover plate proximal to said strip being convex and engaging the latter whereby said joint is sealed against the entrance of moisture thereinto through the junction between said cover plate and said one anchor member.

9. An assembly as set forth in claim 6, wherein said anchor members are elongated and extend along the length of said joint when said anchor members are in their fixed positions, said cover plate being elongated and having a pair of opposed, longitudinal edges adjacent to respective anchor members, each of said longitudinal edges having a rib provided with an outer, convex, anchor member engaging face.

10. An assembly as set forth in claim 6, wherein each of said anchor members and the cover plate are of uniform respective cross-sectional configuration to permit extrusion thereof.

11. An assembly as set forth in claim 6, wherein is provided resilient sealing means around the post means between the cover plate and said projection.

12. An assembly as set forth in claim 6, wherein said post means each comprise a bolt having a head thereon, said cover plate being provided with a hole for clearing each of the bolts but not the heads thereof, and a nut threaded on each of the bolts below said projection, said resilient structure including a coil spring surrounding a respective bolt and engaging a corresponding nut and said projection respectively.

References Cited

UNITED STATES PATENTS

| | | | |
|---|---|---|---|
| 1,625,637 | 4/1927 | Ahel | 52—467 |
| 1,714,237 | 5/1929 | Peterson | 52—467 |
| 2,071,226 | 2/1937 | Durr | 52—573 X |
| 2,135,048 | 11/1938 | Giffin | 94—18 |
| 2,286,019 | 6/1942 | Smith | 94—18 |
| 2,612,243 | 9/1952 | Campbell | 52—288 X |
| 2,948,994 | 8/1960 | Thom | 52—278 |
| 3,183,626 | 5/1965 | Schmitt | 52—396 X |
| 3,197,929 | 8/1965 | Halbostad | 52—463 |
| 3,270,474 | 9/1966 | Driggers | 52—278 |

FRANK L. ABBOTT, *Primary Examiner.*

ALFRED C. PERHAM, *Examiner.*